United States Patent [19]

Tuleja

[11] 4,230,582
[45] Oct. 28, 1980

[54] DRAIN TRAPS WITH STRAINER MEANS

[76] Inventor: Anthony Z. Tuleja, P.O. Box 1564, Sarasota, Fla. 33578

[21] Appl. No.: 874,221

[22] Filed: Feb. 1, 1978

[51] Int. Cl.² ............................................. B01D 21/00
[52] U.S. Cl. .................................. 210/311; 210/435; 210/318; 137/247.51; 4/292
[58] Field of Search ...................... 137/247.41, 247.51, 137/247.45, 550, 546; 4/207, 292; 210/167, 305, 314, 320, 435, 441, 445, 451, 453, 420, 311, 318; 220/322

[56] References Cited

U.S. PATENT DOCUMENTS

| 999,106 | 7/1911 | Hagaman | 210/435 |
|---|---|---|---|
| 1,217,763 | 2/1917 | Hirrich | 137/247.41 X |
| 1,514,979 | 11/1924 | McMillin | 210/435 X |
| 1,574,336 | 2/1926 | Blydenburgh | 137/546 X |
| 2,119,923 | 6/1938 | McIntyre | 210/314 X |
| 2,147,792 | 2/1939 | Knight | 210/445 X |
| 3,843,172 | 10/1974 | Stevens | 251/DIG. 1 |
| 3,935,602 | 2/1976 | Kale | 137/247.41 X |

OTHER PUBLICATIONS

1972 Pontiac Service Manual, Aug. 1971, pp. 5D-3, 5D-8, 5D-11.

Primary Examiner—Harold W. Weakley
Attorney, Agent, or Firm—James Creighton Wray

[57] ABSTRACT

U-shaped traps for waste drain pipes are provided wherein removable strainer means are disposed within the traps for entrapping various size particles and valuable articles which have accidentally entered the drain pipes. The trap is provided with removable access means for permitting the strainer means to be easily placed within or withdrawn from the bottom section of the trap. The strainer means are of a novel construction for the purpose of entrapping particles and for ease of handling.

1 Claim, 14 Drawing Figures

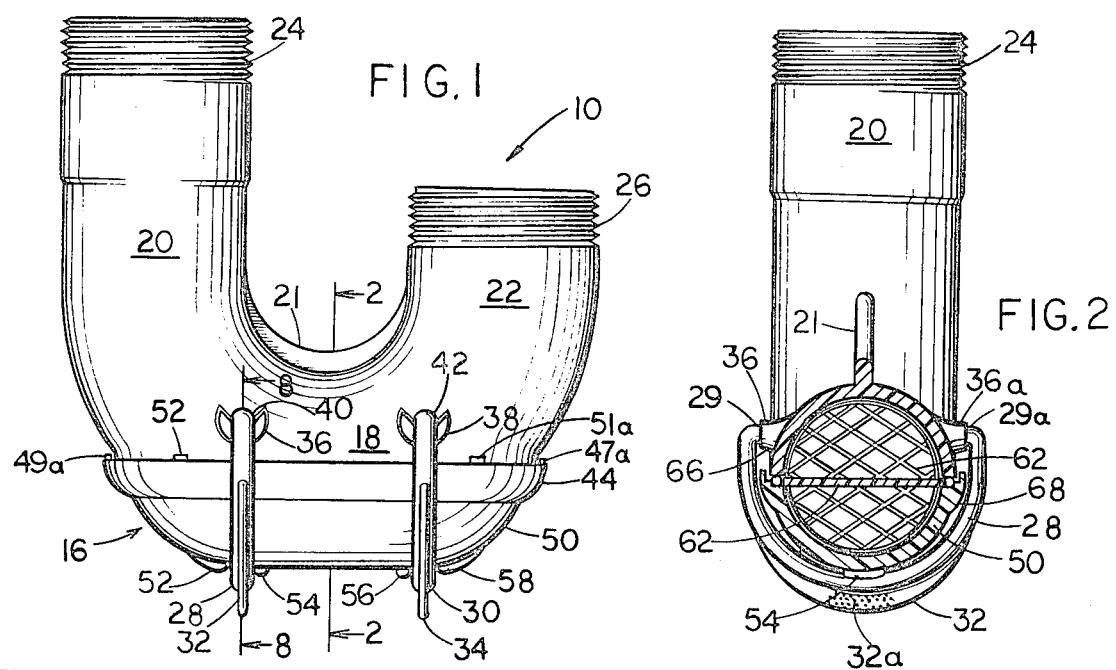
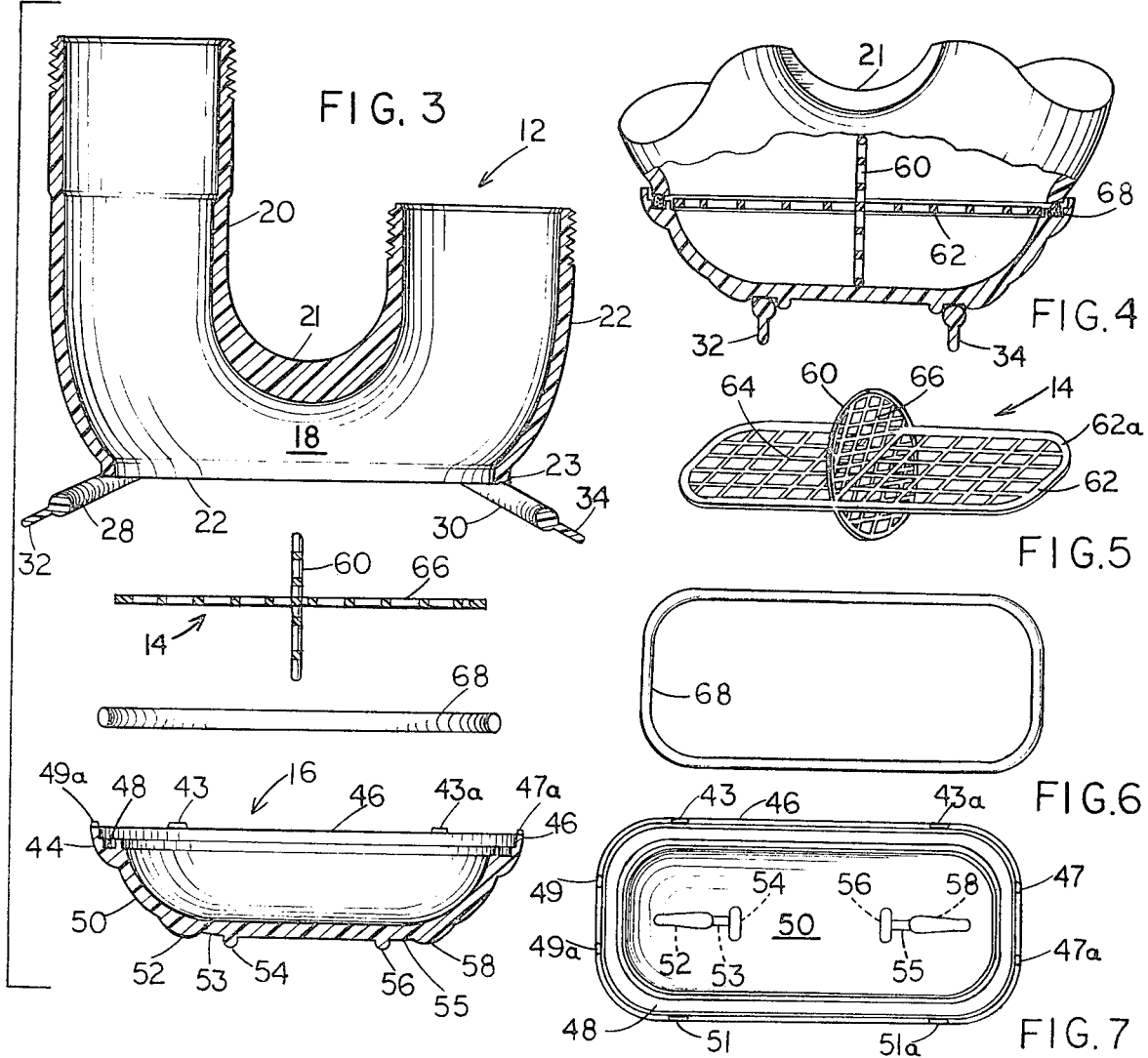

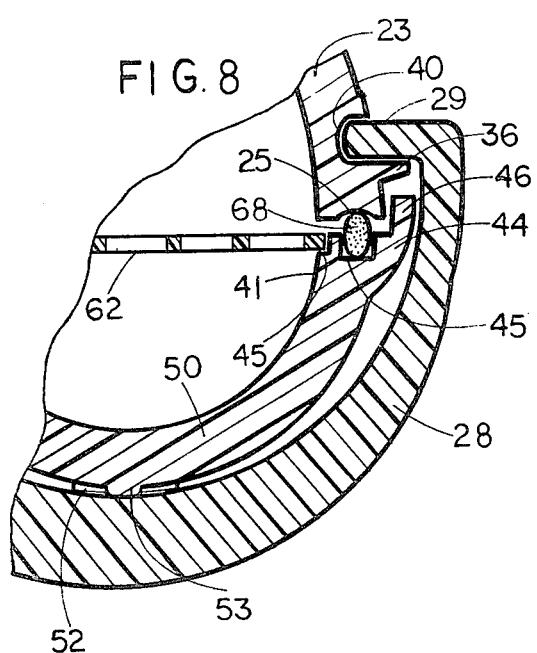
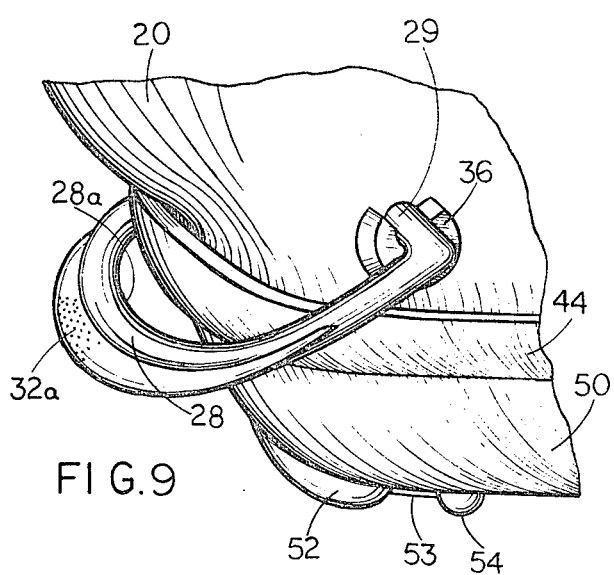
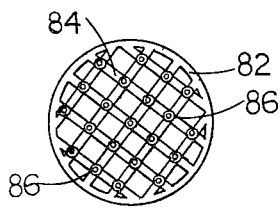
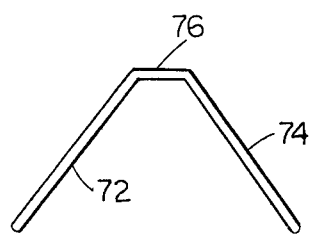
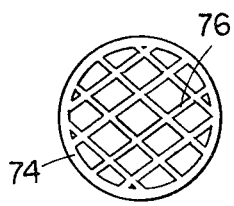
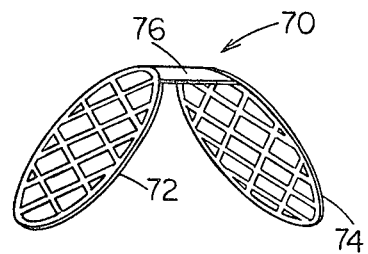
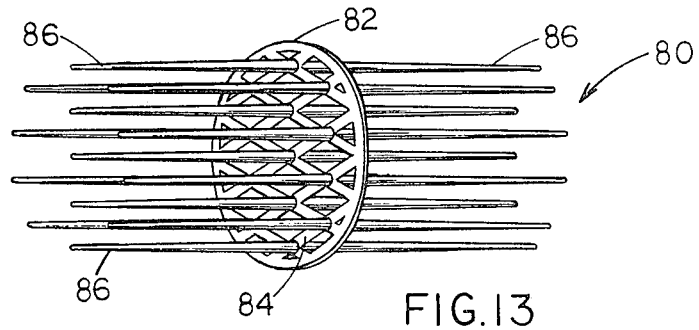

DRAIN TRAPS WITH STRAINER MEANS

BACKGROUND OF THE INVENTION

This invention relates to waste drain pipe traps usable with sinks and other plumbing fixtures, which permit the free flow of waste liquid therethrough, prevent the back-flow of sewer gas, and which can be easily kept free of sediment, etc. which tends to clog the trap. The traps of this invention are designed to separate solid and other foreign bodies from the waste liquids in the drain pipes, and particularly to entrap valuable items such as rings, contact lenses, etc. which may accidentally fall into the waste drain pipes.

The prior art discloses various trap means adapted for use with waste drain pipes for entrapping solids and permitting the flow of waste liquid. Patents disclosing trap means adapted for use directly with the waste drain pipes connected to the sink are as follows:

U.S. Pat. No. 594,169
U.S. Pat. No. 1,770,639
U.S. Pat. No. 1,886,676
U.S. Pat. No. 1,903,366
U.S. Pat. No. 3,788,485

In other prior art patents, the trap means are located in the conventional waste pipe section forming the U or gas trap portion below the drain portion of the sink, etc. as follows:

U.S. Pat. No. 1,198,759
U.S. Pat. No. 1,217,763
U.S. Pat. No. 1,817,376
U.S. Pat. No. 2,593,734

Although many of the above trap means can do a satisfactory separation of solids from the liquids, access to the trap means is difficult and hard to clean, and furthermore, do not contain trap means which can do an adequate separation of the solids from the waste liquid.

In U.S. Pat. No. 3,935,602, there is disclosed a trap used with a drain pipe having the bottom wall of the U-shaped section provided with an opening across which a detachable closure member can be inserted and secured by means of a strap member. A blocking member comprising a plurality of vertically spaced fingers is positioned within the bottom part of the U-shaped section and can be inserted and removed by the removal of the closure member. Although the trap performs satisfactorily, the blocking member does not retain smaller particles or valuable smaller articles such as contact lenses, etc.

BRIEF DESCRIPTION OF THE INVENTION

An object of this invention is to provide novel waste drain pipe traps and strainer means.

A further object of the invention is to provide novel waste drain pipe traps having opening means for easy access for cleanout purposes and for the retrieval of valuable articles accidently entering a drain and retained therein by novel strainer means.

Another object of this invention is to provide a variety of novel strainer means adapted to be disposed in the novel waste drain pipe traps for the purpose of entrapping various sized particles and valuable articles while permitting the flow of waste fluid through the drain trap.

An additional object of this invention is to provide a novel waste pipe drain trap containing an opening, novel strainer means and a detachable closure member with novel securing means for securing and sealing said closure member against said opening.

The above objects are accomplished by this invention in the provision of U-shaped waste drain pipe traps having a novel construction wherein access to the trap is through an opening in the bottom section of the U-shaped construction. The construction comprises a detachable closure member disposed across said opening which can be sealed by means of clamp members. Within the opening of the trap, novel strainer means are provided for the purpose of entrapping various sized particles and valuable articles which may have accidentally entered the drain pipe. The strainer means comprise various types in accordance with the invention particularly adapted to be contained within the opening.

BRIEF DESCRIPTION OF THE DRAWINGS

The invention is best described by reference to the preferred embodiments as illustrated in the drawings wherein:

FIG. 1 is a side elevational view of the waste drain pipe trap of the invention;

FIG. 2 is a cross-sectional view of the wasted pipe drain trap taken along line 2—2 of FIG. 1, disclosing a first embodiment of the strainer means of the invention disposed therein;

FIG. 3 is a vertical cross-sectional exploded view of the drain pipe trap shown in FIGS. 1 and 2;

FIG. 4 is a vertical partial cross-sectional view of the bottom portion of the drain pipe trap of FIGS. 1 and 2 showing the first embodiment of the novel strainer means disposed therein;

FIG. 5 is a perspective view of the first embodiment of the novel strainer means as shown in FIGS. 2 and 4;

FIG. 6 is a top view of an O-ring used in sealing the bottom closure of the drain pipe trap of the invention;

FIG. 7 is a top view of the bottom closure member of the drain pipe trap of the invention;

FIG. 8 is a partial enlarged, cross-sectional view along line 8—8 of FIG. 1 of the drain pipe trap disclosing details of the clamping member and the bottom closure member;

FIG. 9 is a partial perspective view of the drain pipe trap disclosing further details of the clamping member and the bottom closure member;

FIG. 10 is a perspective view of a second embodiment of the novel strainer means of the invention;

FIG. 11 is an end view of the strainer means shown in FIG. 10;

FIG. 12 is a side view of the strainer means shown in FIG. 10;

FIG. 13 is an enlarged perspective view of a third embodiment of the novel strainer means of the invention; and FIG. 14 is an end view of the strainer means shown in FIG. 13.

DESCRIPTION OF THE PREFERRED EMBODIMENTS

Referring now to the drawings and particularly to FIGS. 1-9, a drain pipe trap unit generally designated by the numeral 10, comprises a U-shaped integral trap member with conventional dip portion 21 having vertical conduit sections 20 and 22, horizontal section 18 and threaded open ends 24 and 26 adapted to be connected to a drain pipe of a sink and an outlet pipe (both not shown), respectively. The trap is provided with a bottom closure member shown generally at 16 and clamping members 28 and 30. As shown in exploded form in FIG. 3, the trap comprises the U-shaped body of the trap with the clamping members shown generally by the numeral 12, the strainer member shown generally by the numeral 14, an O-ring 68, and the bottom closure member 50. The O-ring shown is ovate in cross-section and was found to be better suited than the conventional round O-ring to seal the opening, because the ovate shape molds tightly into the recesses between the bottom closure member and the U-shaped body.

The horizontal ends of each of the clamping members 28 and 30 are disposed in opposite holes provided in the horizontal portion 18 of the body 12. Thus, as shown in FIGS. 8 and 9, end 29 of clamp 28 is pivotally disposed in hole 40, which also comprises a supporting rim 36. Similarly, the other end 29a of clamp 28 is pivotally disposed in a hole (not shown) comprising rim 36a. Clamp 30 has its ends similarly pivotally disposed in opposte holes (not shown) with one end 42 disposed in a hole comprising rim 38 and the other end in a hole and rim (not shown) on the opposite side. Clamp members 28 and 30 comprise reinforcing ribs 32 and 34, respectively, each having a roughened surface such as 32a on rib 32, which provide a surer grip on the clamp when they are being locked or unlocked as will be seen hereinafter.

The bottom closure member 16 has a generally bowl-shape and comprises a rim 46 with a reinforcing shoulder 44 and a bowl portion 50. At the upper portion 41 of the bowl portion within the rim there is provided a groove 48 adapted to retain an O-ring 68 adapted to seat against annular groove 25 of the lower portion 23 of U-shaped member 12. An annular ledge or seat 45 is also provided at the upper portion 41 of the bowl portion adjacent the groove 48 and is for the purpose of retaining the strainer member 14. Rim 46 is provided with upstanding cleats 43, 43a, 47, 47a, 49, 49a, 51 and 51a around the periphery thereof for the purpose of retaining the bottom portion 22 of U-shaped member 12 therewithin as will be described hereinafter. At the outside bottom of the bowl portion 50 there is provided a pair of retaining members for the clamps 28 and 30. As clearly shown in FIGS. 1, 3 and 9, a ridge 53 is disposed between a tapered oval rib member 52 and a stop 54 which are adapted to retain clamp 28. Similarly, clamp 30 is retained by rib member 58 and stop 56 by a ridge member 55.

The strainer member 14 comprises a round vertical member 60 having a series of openings 66 across its surface, and a generally rectangular horizontal member 62 having a rim 62a and a series of openings 64 across its surface. Holes 64 are generally larger than holes 66 whereby many of the particles not passing through holes 66 fall into the bowl portion 50 of the trap.

The drain pipe trap is assembled as shown in FIGS. 2-7. O-ring 68 is placed in groove 48, and the rim 62a of strainer member 14 is placed on annular ledge 45 (FIG. 8) of closure member 16. The assembled bottom closure member 16 is fitted onto rim 22 of member 12 whereby rim 22 engages the O-ring 68 whereby vertical member 60 of the strainer extends up into and across the vertical portion of horizontal section 18 of U-shaped member 12 and down into and across the bowl portion 50 of closure member 16 (FIG. 2). Clamps 28 and 30 are pivoted and forced onto tapered rib members 52 and 58, until they snap into a closed position onto ridges 53 and 55 against stops 54 and 56, respectively. The clamp members tightly hold the closure member against the bottom rim of the U-shaped member and the O-ring seals the two together preventing any leakage of water. The cleats such as 43, 47 and 51 extend upwardly along the outer surface of rim 22 and also aid in retaining member 12 and closure member 16 together.

The structure of strainer members of the invention are such that they will retain any large valuable articles such as rings, earrings, contact lenses, etc. which may accidentally enter the drain. Retrieval of the valuable articles is simply accomplished by disassembling the trap member and withdrawing the strainer means. The purpose of the strainer means also is to provide a drain pipe trap to prevent stoppage by particles of relatively inaccessible downstream drain pipes. The use of strainer members having relatively small mesh size openings permits separation and retention of various sized particles in the trap and enables longer usage of the trap between cleanouts. The trap thus has for its purpose both the immediate access for valuable articles as well as retaining various sized foreign particles for eventual cleanout.

Referring now to FIGS. 10–12 a second embodiment of strainer means 70 is shown which can be used in the horizontal section 18 of drain pipe trap 10 similarly as strainer means 14. Strainer means 70 comprises a pair of circular strainer members 72 and 74 joined together by member 76. Members 72 and 74 have a series of openings 76 which can be the same or different mesh sizes. Particle retained on the surfaces thereof will eventually fall into bowl 50. The mesh size openings of the strainer 70 are adapted to be suitable to retain various size particles and are preferably of a fine mesh size. It will retain the various particles and as bowl 50 fills with particles fluid flow is not impeded since it can flow through the strainer. When the bowl is substantially filled with particles, fluid flow will be impeded and the strainer can be removed for cleaning and replacing in the trap.

In FIGS. 13 and 14, a third type of strainer means 80 is shown which can be used in the horizontal section 18 of drain trap 10 similarly as strainer means 14. Strainer means 80 is formed of a circular member 82 which comprises a plurality of fingers 86 extending perpendicularly from each side of surface 84. Fingers 86 are spaced in rows along surface 84 and the fingers can be of different lengths. The member 82 containing mesh size openings and fingers 86 form the strainer means 60. Fingers 86 of the downstream side are adapted to retain the strainer within the horizontal section 18 and the bowl 50. The upstream fingers are adapted to retain various sized particles and to permit fluid to flow therethrough.

The drain traps and strainer means of the invention can be formed or molded of various suitable plastic materials or metals. Particularly, with respect to certain transparent rigid and strong plastic materials, the use thereof in the drain traps permits easy visible examination of the trap to determine if a valuable is trapped therein or whether the trap has accumulated a great amount of foreign matter.

Although the invention has been illustrated and described herein with reference to preferred embodiments, it is nevertheless not intended to be limited to the details shown, since various modifications may be made therein within the scope and range of the claims.

What is claimed is:

1. A U-shaped pipe trap member comprising:

a U-shaped conduit comprising spaced vertical conduit sections and a horizontal section connecting the vertical conduit sections, the horizontal section having plural clamp receiving holes, and the horizontal section having an open bottom, the open bottom having a continuous lower rim portion with an annular groove, U-shaped clamping members disposed transversely on the horizontal section, the clamping members having horizontal ends disposed in the holes of the horizontal section, and having bottom portions, the clamping members being pivotally held by the ends on said horizontal section, a closure member comprising an upward opening bowl having an upper rim with an annular groove, the bowl having an inward extending annular ledge positioned inward of the upper rim, and the bowl having clamping member retaining members on an outside bottom of the bowl, each retaining member comprising an outward tapered rib, a stop spaced inward from the rib and a ridge between the rib and stop for receiving a bottom portion of a U-shaped clamping member, sealing means having an ovate cross section disposed in the annular groove in the upper rim of the bowl for fitting into the annular groove in the lower rim portion of the horizontal section, a strainer comprising a round vertical member having a first series of strainer openings and a generally rectangular horizontal strainer member having a rim and a second series of openings, the first series of openings in a said vertical member being smaller than the second series of openings in a said horizontal member, whereby particles not passing through the first openings pass through the second openings into the bowl, said strainer means being disposed in said bowl with the rim of the horizontal strainer member being disposed on the ledge of the bowl and the vertical strainer member extending downward into the bowl and upward into the horizontal section of the U-shaped conduit.

* * * * *